US012387032B2

(12) United States Patent
Kaplan et al.

(10) Patent No.: US 12,387,032 B2
(45) Date of Patent: Aug. 12, 2025

(54) SECURE VOTING IN A COLLABORATIVE ONLINE DOCUMENT EDITOR

(71) Applicant: GOOGLE LLC, Mountain View, CA (US)

(72) Inventors: Blake Kaplan, New York, NY (US); Behnoosh Hariri, New York, NY (US); Ali Abdelhadi, New York, NY (US); Gregory George Galante, Little Silver, NJ (US)

(73) Assignee: GOOGLE LLC, Mountain View, CA (US)

( * ) Notice: Subject to any disclaimer, the term of this patent is extended or adjusted under 35 U.S.C. 154(b) by 255 days.

(21) Appl. No.: 18/111,836

(22) Filed: Feb. 20, 2023

(65) Prior Publication Data
US 2024/0281592 A1    Aug. 22, 2024

(51) Int. Cl.
G06F 40/166    (2020.01)
G06F 3/0482    (2013.01)
(Continued)

(52) U.S. Cl.
CPC .......... *G06F 40/166* (2020.01); *G06F 3/0482* (2013.01); *G06F 3/0484* (2013.01); *H04L 9/3247* (2013.01)

(58) Field of Classification Search
CPC .... G06F 40/166; G06F 3/0482; G06F 3/0484; G06F 21/64; H04L 9/3247; G06Q 10/103; G06Q 10/101
See application file for complete search history.

(56) References Cited

U.S. PATENT DOCUMENTS 8,819,564 B1    8/2014  Heath et al.
10,979,225 B1   4/2021  Shiralkar
(Continued)

FOREIGN PATENT DOCUMENTS

AU    2012225621 A1 * 10/2013 ............. G06F 21/31
TW     202103038 A  *  1/2021 ............. G06F 21/64
(Continued)

OTHER PUBLICATIONS

European Patent Office; International Search Report and Written Opinion issued in Application No. PCT/US2023/084630; 11 pages; dated Apr. 19, 2024.
(Continued)

*Primary Examiner* — Richard G Keehn
(74) *Attorney, Agent, or Firm* — Gray Ice Higdon

(57) ABSTRACT

Techniques are described herein for implementing collaborative poll elements within a document in a document editing application. A method includes: receiving first user interface input that indicates a first vote, associated with a first user, in an interactive poll element embedded in a first document; determining that the first user interface input is received via a first instance of the document editing application; and in response to determining that the first user interface input is received via the first instance of the document editing application: updating a list of votes associated with the interactive poll element by adding the vote, corresponding to the first user, to the list of votes associated with the interactive poll element; updating a cryptographic digital signature associated with the interactive poll element; and providing the updated list of votes and the updated cryptographic digital signature to each of the plurality of users.

20 Claims, 11 Drawing Sheets

(51) Int. Cl.
*G06F 3/0484* (2022.01)
*H04L 9/32* (2006.01)

(56) References Cited

U.S. PATENT DOCUMENTS

| | | | |
|---|---|---|---|
| 11,049,349 B2* | 6/2021 | Onischuk | G07C 13/00 |
| 2008/0114739 A1* | 5/2008 | Hayes | G06F 16/951 |
| 2020/0059352 A1* | 2/2020 | Walling | H04L 9/0637 |
| 2021/0117926 A1* | 4/2021 | Faulkner | G06Q 10/107 |

FOREIGN PATENT DOCUMENTS

| | | | | |
|---|---|---|---|---|
| WO | 2008065349 A1 | 6/2008 | | |
| WO | WO-2017011601 A1 * | 1/2017 | ......... | G06F 12/1408 |
| WO | WO-2019175837 A1 * | 9/2019 | ......... | G06F 16/2379 |
| WO | 2020259395 | 12/2020 | | |

OTHER PUBLICATIONS

"Think like an editor (content strategy and UX writing)" Retrieved from https://openclassrooms.com/en/courses/4556226-think-like-an-edorit-content-stratedy-and-ux-writing/5502001-create-documents-to-collaborate-on. 6 pages, dated Feb. 10, 2023.
Sarthank Dogra "Google announces Smart Canvas, a new collaboration tool for Google Workspace, at Google IO" India Today, 6 pages, dated May 19, 2021.

* cited by examiner

800

Project Name

September 04, 20XX

Overview

Lorem ipsum dolor sit amet

Ideas

| Idea | Suggestor | Votes | |
|---|---|---|---|
| Start a voting table | Keri Moore | +0 | 810-1 |
| | Keri Moore | +0 | 810-2 |
| | | +0 | 810-3 |

SECURE VOTING IN A COLLABORATIVE ONLINE DOCUMENT EDITOR

BACKGROUND

Collaborative online document editors (e.g., text editors) may allow multiple users to collaboratively create, view, and edit documents. For example, a collaborative online text editor may allow users who are members of a particular team within a company or other organization to collaborate on a particular document by making edits (e.g., revisions) to the document in a synchronous manner and/or in an asynchronous manner.

When users are collaborating on a document in an online document editor, they may want to receive feedback from the collaborating users, e.g., regarding their respective preferences. Users may indicate their respective preferences by manually entering comments into the document. This manual approach, however, may be an inefficient use of user time and computer storage resources, as it may result in excessive data entry, client device usage, and duplication of the same data (e.g., due to duplicated responses) in multiple places in a document.

Users may insert a link in a document to a survey that is hosted outside of the document (e.g., on a third party website), to allow users to indicate their respective preferences. This approach, however, may also be an inefficient use of user time and computer storage resources, as it may result in excessive data entry (e.g., due to duplication of the same content from the document within a survey created on a third party website) and client device usage. Additionally, users may need to manually specify their names and/or email addresses when completing the survey that is hosted outside of the document. However, this may allow for false attribution of votes, in addition to resulting in excessive data entry. For example, User A may provide User B's name and/or email address when completing the survey. Additionally, the survey link may be copied into a different document, which may allow a user to misrepresent the results of the survey (e.g., as pertaining to the different document).

SUMMARY

Techniques described herein relate to implementing collaborative poll elements (voting elements) within a document in a document editing application. These poll elements may provide for vote attribution integrity and security, such that a user is prevented from voting on behalf of another user and prevented from impersonating another user. Additionally, if a poll element is copied and pasted into a document, the system may confirm that the pasted voting state previously existed within this document or another, and that any vote included in a copied poll element is traceable back to its original vote caster. Furthermore, techniques described herein may allow for a reduction in usage of power resources and/or other computational resource(s) of a client device, by providing a mechanism to efficiently collect feedback without requiring users to manually enter comments into a document.

In various implementations, a document editing application may receive a vote via an interactive poll element embedded in document, validate the vote by confirming that it is received via an instance of the document editing application associated with a logged in account of the first user, and in response, update a list of votes and a cryptographic digital signature associated with the interactive poll element. The cryptographic signature may be usable to verify the authenticity of the list of votes.

In some implementations, a poll element may be included within the content of a document, alongside related content. The poll element within the document may allow for casting or un-casting a vote with a single click. Additionally, the poll element may enforce strict vote attribution integrity and security. For example, in some implementations, a user is only able to vote on the user's own behalf, and the system may prevent a user from impersonating another user when casting a vote. Furthermore, if a poll element is copied and pasted into a document, the system may validate the pasted voting state, ensuring that it previously existed within this document or another. In some implementations, any vote included in a poll element may be traced back to its original vote caster.

In some implementations, with each incremental vote added, the system verifies that the added vote refers directly to the user casting it, using a per-user identifier. In the case that there is a mismatch (e.g., user A casting a vote pretending to be user B), the system may reject the vote based on having false and invalid attribution. After an incremental vote is confirmed as being valid, the system may add the incremental vote to the list of votes and may calculate a cryptographic hash signing the full vote list state, including a per-document identifier. The system may then communicate the update to other collaborators, including an updated signature hash for the poll element. On the other hand, when the new vote does not match the user casting the vote, the system may reject the new vote as being invalid and not communicate an update to the other collaborators.

In some implementations, when re-inserting a poll element containing an existing voting state (e.g., copying and pasting an existing poll element that other users have already voted on), the system may ensure that the full list of votes matches a prior valid vote state within the document by checking a cryptographic hash. For example, the voting information may be sent to a server along with a cryptographic hash. The server may then confirm that the given vote state is valid, if the voting information can be used to verify the signature. In some implementations, if the provided cryptographic hash for the voting state cannot be verified, the server may reject the poll element insertion as having false attribution. In some implementations, if a user attempts to insert a poll element with manipulated votes (e.g., including new votes for users who never voted), the server may reject the poll element as being invalid since the cryptographic signature hash cannot be verified. In some implementations, if the poll element is copied from another valid document and is verified to have properly attributed votes, the system may, upon a user hovering a cursor over the poll element, display a dialog that contains a warning that the hovered-over poll element was copied over from another document.

In various implementations, a method implemented by one or more processors may include: receiving first user interface input that indicates a first vote, associated with a first user, in an interactive poll element embedded in a first document in a document editing application, the first document being accessible to a plurality of users including the first user; determining that the first user interface input is received via a first instance of the document editing application, the first instance of the document editing application being associated with a logged in account of the first user; and in response to determining that the first user interface input is received via the first instance of the document editing application, the first instance of the document editing application being associated with the logged in account of the first user: updating a list of votes associated with the interactive poll element by adding the vote, corresponding to the first user, to the list of votes associated with the interactive poll element; updating a cryptographic digital signature associated with the interactive poll element, the cryptographic digital signature being based on (i) a hash value generated based on the updated list of votes and (ii) an identifier associated with the first document; and providing the updated list of votes and the updated cryptographic digital signature to each of the plurality of users.

In some implementations, the method further includes: receiving second user interface input that indicates a second vote, associated with a second user, in the interactive poll element embedded in the first document in the document editing application; determining that the second user interface input is received via a second instance of the document editing application, the second instance of the document editing application not being associated with a logged in account of the second user; in response to determining that the second user interface input is received via the second instance of the document editing application, the second instance of the document editing application not being associated with the logged in account of the second user, determining that the second vote is invalid; and in response to determining that the second vote is invalid, avoiding updating the list of votes associated with the interactive poll element.

In some implementations, the method further includes: determining that the interactive poll element has been moved from a first position in the first document to a second position in the first document; and in response to determining that the interactive poll element has been moved from the first position in the first document to the second position in the first document, providing, to each of the plurality of users, an indication that the poll element has been moved within the first document.

In some implementations, the method further includes: determining that a copy of the interactive poll element embedded in the first document has been inserted into a second document, the second document being a copy of the first document; and in response to determining that the copy of the interactive poll element has been inserted into the second document, providing, to each of the plurality of users, an indication that the copy of the interactive poll element has been copied from the interactive poll element embedded in the first document. In some implementations, the method further includes: updating a cryptographic digital signature associated with the copy of the interactive poll element, the cryptographic digital signature being based on (i) the hash value generated based on the updated list of votes and (ii) an identifier associated with the second document; and providing the updated cryptographic digital signature, associated with the copy of the interactive poll element, to each of the plurality of users. In some implementations, the method further includes: determining that the second document is no longer the copy of the first document; and in response to determining that the second document is no longer the copy of the first document: deleting the list of votes associated with the copy of the interactive poll element; and updating the copy of the interactive poll element based on deleting the list of votes.

In some implementations, the method further includes: determining that the interactive poll element has been moved from the first document to a second document, the second document being different from the first document; and in response to determining that the interactive poll element has been moved from the first document to the second document: deleting the list of votes associated with the interactive poll element; and updating the interactive poll element based on deleting the list of votes.

In some additional or alternative implementations, a computer program product may include one or more computer-readable storage media having program instructions collectively stored on the one or more computer-readable storage media. The program instructions may be executable to: receive a request, from a first user, to insert a copy of an interactive poll element into a first document in a document editing application, the first document being accessible to a plurality of users including the first user, and the interactive poll element including (i) a list of votes associated with the interactive poll element and (ii) a cryptographic digital signature that is based on a hash value generated based on the list of votes and an identifier associated with a document into which the interactive poll element is embedded; validate the request to insert the copy of the interactive poll element into the first document, wherein validating the request is based on the list of votes and the cryptographic digital signature; in response to validating the request to insert the copy of the interactive poll element into the first document: insert the copy of the interactive poll element into the first document; generate a cryptographic digital signature associated with the copy of the interactive poll element, the cryptographic digital signature being based on (i) the hash value generated based on the list of votes and (ii) an identifier associated with the first document; and provide the cryptographic digital signature, associated with the copy of the interactive poll element, to each of the plurality of users.

In some implementations, the first document is the document into which the interactive poll element is embedded; and the request to insert the copy of the interactive poll element into the first document includes a request to insert the copy of the interactive poll element into the first document at a second location that is different from a first location, in the first document, at which interactive poll element is positioned.

In some implementations, the first document is a copy of the document into which the interactive poll element is embedded.

In some implementations, the program instructions are further executable to: receive first user interface input that indicates a first vote, associated with a second user, in the copy of the interactive poll element; determine that the first user interface input is received via a first instance of the document editing application, the first instance of the document editing application being associated with a logged in account of the second user; in response to determining that the first user interface input is received via the first instance of the document editing application, the first instance of the document editing application being associated with the logged in account of the second user: update a list of votes associated with the copy of the interactive poll element by adding the vote, corresponding to the second user, to the list of votes associated with the copy of the interactive poll element; update the cryptographic digital signature associated with the copy of the interactive poll element, the cryptographic digital signature being based on (i) the hash value generated based on the updated list of votes and (ii) the identifier associated with the first document; and provide the updated list of votes and the updated cryptographic digital signature to each of the plurality of users.

In some implementations, the program instructions are further executable to: receive second user interface input that indicates a second vote, associated with a third user, in the copy of the interactive poll element; determine that the second user interface input is received via a second instance of the document editing application, the second instance of the document editing application not being associated with a logged in account of the third user; in response to determining that the second user interface input is received via the second instance of the document editing application, the second instance of the document editing application not being associated with the logged in account of the third user, determining that the second vote is invalid; and in response to determining that the second vote is invalid, avoiding updating the list of votes associated with the copy of the interactive poll element.

In some implementations, the program instructions are further executable to provide, to each of the plurality of users, an indication that the copy of the interactive poll element has been copied from the interactive poll element.

In some additional or alternative implementations, a system may include a processor, a computer-readable memory, one or more computer-readable storage media, and program instructions collectively stored on the one or more computer-readable storage media. The program instructions may be executable to: receive first user interface input that indicates a first vote, associated with a first user, in an interactive poll element embedded in a first document in a document editing application, the first document being accessible to a plurality of users including the first user; determine that the first user interface input is received via a first instance of the document editing application, the first instance of the document editing application being associated with a logged in account of the first user; and in response to determining that the first user interface input is received via the first instance of the document editing application, the first instance of the document editing application being associated with the logged in account of the first user: update a list of votes associated with the interactive poll element by adding the vote, corresponding to the first user, to the list of votes associated with the interactive poll element; update a cryptographic digital signature associated with the interactive poll element, the cryptographic digital signature being based on (i) a hash value generated based on the updated list of votes and (ii) an identifier associated with the first document; and provide the updated list of votes and the updated cryptographic digital signature to each of the plurality of users.

The above description is provided as an overview of some implementations of the present disclosure. Further description of those implementations, and other implementations, are described in more detail below.

Various implementations can include a non-transitory computer readable storage medium storing instructions executable by one or more processors (e.g., central processing unit(s) (CPU(s)), graphics processing unit(s) (GPU(s)), digital signal processor(s) (DSP(s)), and/or tensor processing unit(s) (TPU(s)) to perform a method such as one or more of the methods described herein. Other implementations can include a client device that includes processor(s) operable to execute stored instructions to perform a method, such as one or more of the methods described herein. Yet other implementations can include a system of one or more servers that include one or more processors operable to execute stored instructions to perform a method such as one or more of the methods described herein.

BRIEF DESCRIPTION OF THE DRAWINGS

FIG. 8, FIG. 9, and FIG. 10 depict example applications of techniques described herein, in accordance with various implementations.

DETAILED DESCRIPTION

Figure 1:
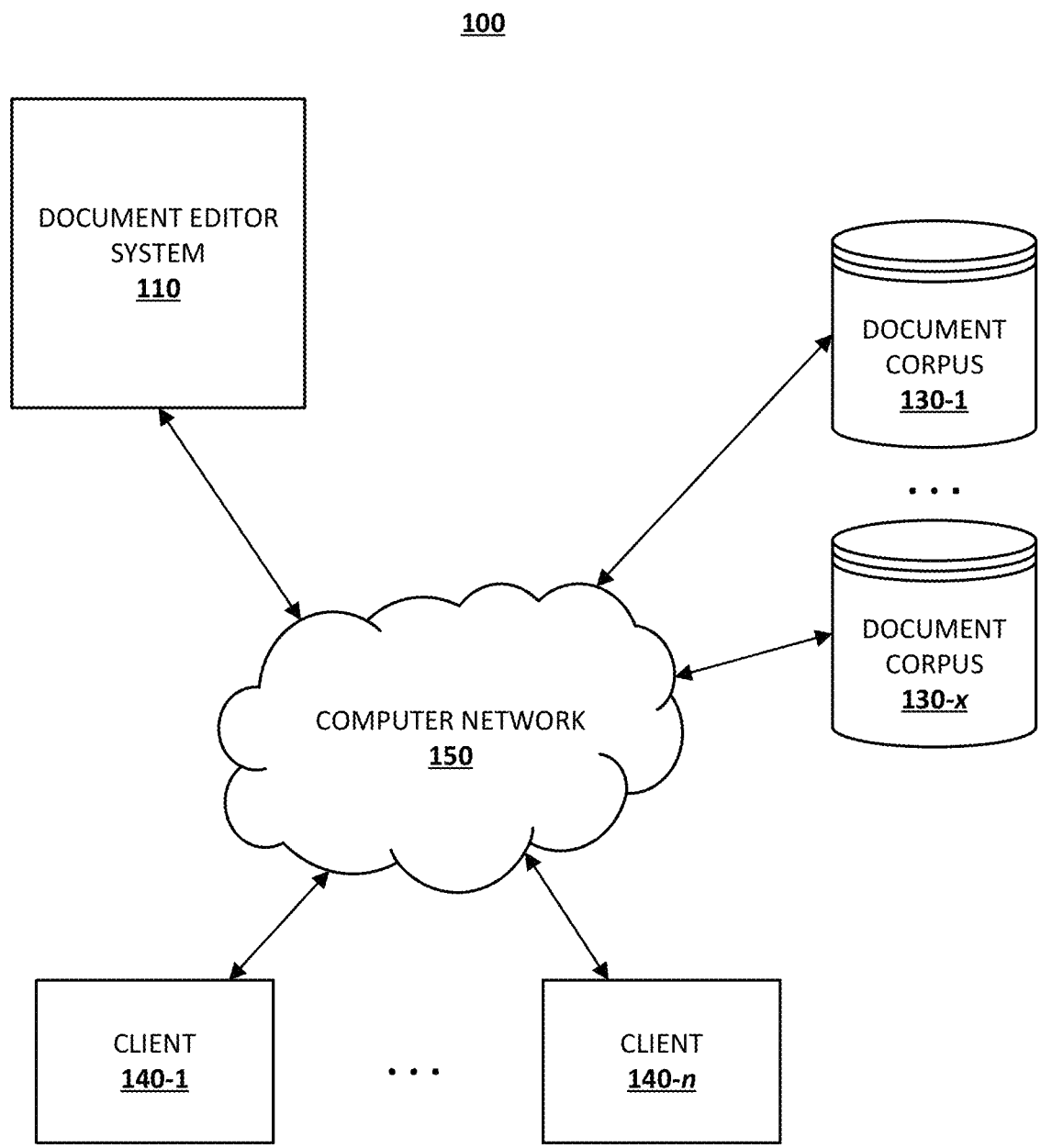
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a document editor system 110, may be implemented using one or more server computing devices that form what is sometimes referred to as a "cloud infrastructure," although this is not required.

In implementations, the environment 100 may include a document editor system 110 that implements an online document editor application (e.g., a collaborative online text editor or word processor) that is accessible from various clients, including clients 140-1, . . . , 140-n that may be included in the environment 100, through either a thin client interface, such as a web browser (e.g., a web-based collaborative online text editor application), or a program interface. In implementations, the online document editor application that is implemented by the document editor system 110 may be a software as a service (SaaS) document editor application. The document editor system 110 and the clients 140-1, . . . , 140-n may be in communication via a computer network 150, which may be any suitable network including any combination of a local area network (LAN), wide area network (WAN), or the Internet. The document editor system 110 may be configured to perform selected aspects of the present disclosure and/or to cause one or more of the clients 140-1, . . . , 140-n to perform selected aspects of the present disclosure in order to implement collaborative poll elements within a document in a document editing application using one or more of the clients 140-1, . . . , 140-n.

Each of the clients 140-1, . . . , 140-n may be, for example, a user computing device that is used by a user to access a document editor application via a document editor application user interface, such as a SaaS document editor application, that is provided by the document editor system 110, e.g., through a web browser. In an example, the clients 140-1, . . . , 140-n may be user computing devices associated with an individual or an entity or organization such as a business (e.g., financial institute, bank, etc.), non-profit, club, university, government agency, or any other organization that uses a document editor application. For example, a business may operate a document editor application to create, modify, and/or view one or more documents to manage reports, proposals, financial records, business records, client lists, and so forth.

In various implementations, each of the clients 140-1, . . . , 140-n may include one or more user interface input devices such as a physical keyboard, a touch screen, and/or a microphone, to name a few. Additionally, each of the clients 140-1, . . . , 140-n may include one or more user interface output devices such as a display screen, a haptic feedback device, and/or speaker(s), to name a few.

In various implementations, the environment 100 may include document corpuses 130-1, . . . , 130-x that are accessible to the clients 140-1, . . . , 140-n via the computer network 150 or another network. Each of the document corpuses 130-1, . . . , 130-x may include multiple documents (e.g., text documents) created by one or more of the clients 140-1, . . . , 140-n, e.g., using the document editor system 110. In an example, the document corpuses 130-1, . . . , 130-x may include a set of documents created, edited, or viewed by users of one or more of the clients 140-1, . . . , 140-n associated with a particular entity or organization. Each of the documents stored in the document corpuses 130-1, . . . , 130-x may be associated with a set of permissions which may, as an example, define users and/or groups who have access to view and/or edit the document.

The document editor system 110 may be configured to provide (e.g., via a document editor application that displays a document editor application user interface on clients 140-1, . . . , 140-n) functionality for collaborative poll elements within documents that are created, modified, and/or viewed using one or more of the clients 140-1, . . . , 140-n. For example, the document editor system 110 may be configured to receive, from one of the clients 140-1, . . . , 140-n, user interface input that corresponds to a document in a document editing application. The document editor system 110 may be configured to automatically parse received user interface input to identify a request to insert, copy, move, etc., an interactive poll element in a document. The document editor system 110 may also be configured to automatically parse received user interface input to identify a vote, associated with a user, in an interactive poll element embedded in a document.

For example, the user interface input may include a single tap/click of a user (e.g., on an icon in the user interface, the icon being associated with an interactive poll element) or may include two or more taps/clicks (e.g., a first tap/click may bring up a menu, and a second tap/click may select a menu item from the menu, the menu item being associated with an interactive poll element). The user interface input received by the document editor system 110 from one of the clients 140-1, . . . , 140-n may identify, from one or more voting options, a vote to cast (e.g., based on a location of the click/tap, based on a cursor location, and/or based on additional input following or preceding the tap(s)/click(s)).

In response to receiving the user interface input, the document editor system 110 may determine that the user interface input is received via an instance of the document editing application, the instance of the document editing application being associated with a logged in account of the user; and in response to determining that the user interface input is received via the instance of the document editing application, the instance of the document editing application being associated with the logged in account of the first user: update a list of votes associated with the interactive poll element by adding the vote, corresponding to the user, to the list of votes associated with the interactive poll element; update a cryptographic digital signature associated with the interactive poll element, the cryptographic digital signature being based on (i) a hash value generated based on the updated list of votes and (ii) an identifier associated with the first document; and provide the updated list of votes and the updated cryptographic digital signature to each of a plurality of users.

Figure 2:
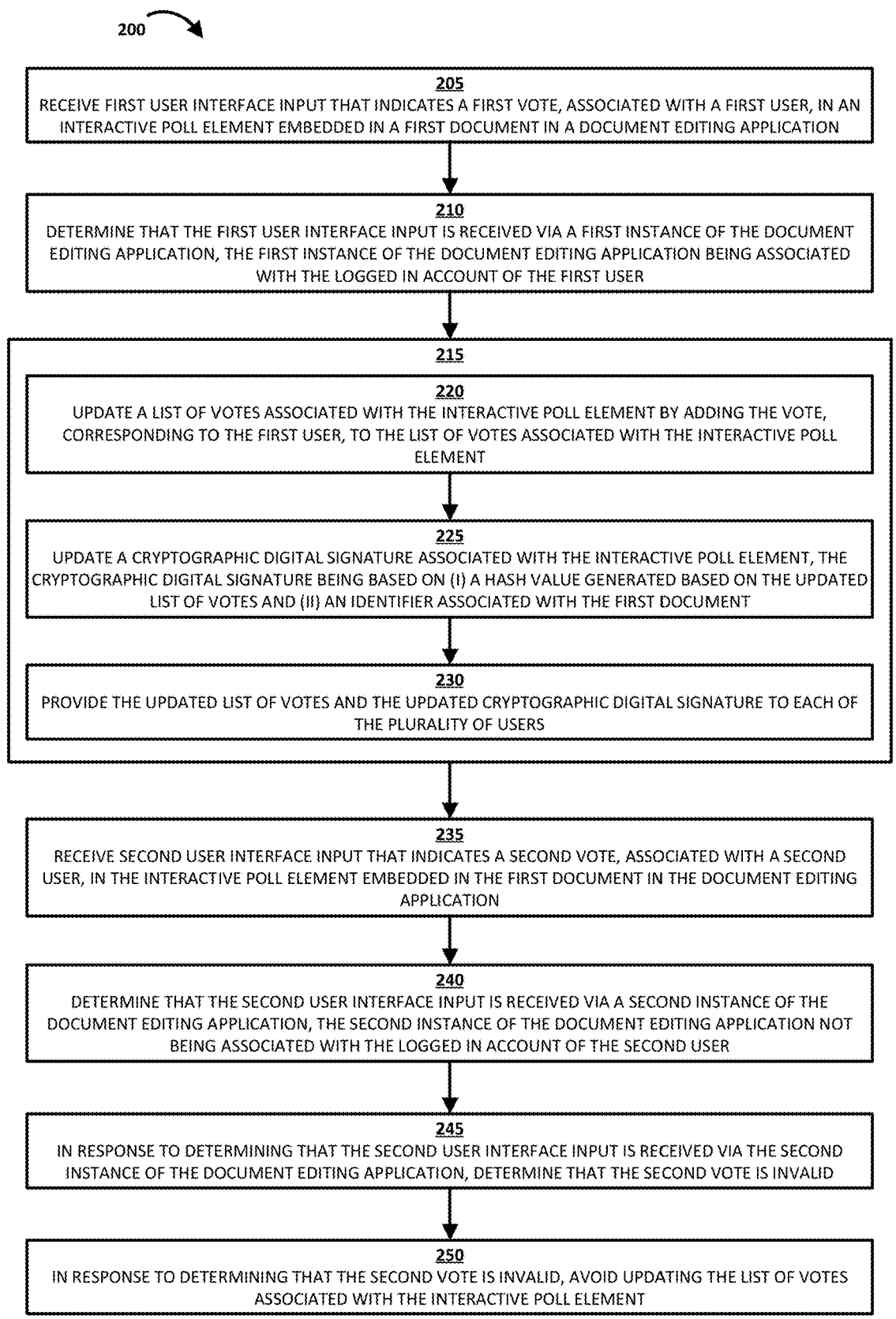
FIG. 2, FIG. 3, FIG. 4, FIG. 5, FIG. 6, and FIG. 7 depict flowcharts illustrating example methods of implementing collaborative poll elements within a document in a document editing application.

FIG. 2 depicts a flowchart illustrating an example method 200 of implementing collaborative poll elements within a document in a document editing application. For convenience, the operations of the method 200 are described with reference to a system that performs the operations. This system of method 200 includes one or more processors and/or other component(s) of various computer systems. Moreover, while operations of method 200 are shown in a particular order, this is not meant to be limiting. One or more operations may be reordered, omitted, or added.

At block 205, the system receives first user interface input that indicates a first vote, associated with a first user, in an interactive poll element embedded in a first document in a document editing application. In some implementations, the first document is accessible to a plurality of users including the first user. In some implementations, a document editing application (document editor) rendered by a web browser may be displayed on one or more of the user interface output devices of one of the clients 140-1, . . . , 140-n. The first user may use one or more of the user interface input devices of one of the clients 140-1, . . . , 140-n to provide the first user interface input that indicates that first vote, that is received by the document editing system 110. In some implementations, the first user interface input may include a single tap/click of the first user (e.g., on an icon in the user interface, the icon being associated with an interactive poll element) or may include two or more taps/clicks (e.g., a first tap/click may bring up a menu, and a second tap/click may select a menu item from the menu, the menu item being associated with an interactive poll element). The first user interface input received by the document editor system 110 from one of the clients 140-1, . . . , 140-n may identify, from one or more voting options, a vote to cast (e.g., based on a location of the click/tap, based on a cursor location, and/or based on additional input following or preceding the tap(s)/click(s)).

At block 210, the system determines that the first user interface input is received via a first instance of the document editing application. The first instance of the document editing application may be associated with a logged in account of the first user. In some implementations, the document editor system 110 determines that the first user interface input is received, at block 205, via a first instance of the document editing application running on one of the clients 140-1, . . . , 140-n, the first instance of the document editing application being associated with a logged in account of the first user.

At block 215, in response to determining that the first user interface input is received via the first instance of the document editing application, the first instance of the document editing application being associated with the logged in account of the first user, the system proceeds to blocks 220 through 230. In some implementations, in response to determining, at block 210, that the first user interface input is received via the first instance of the document editing application, the first instance of the document editing application being associated with the logged in account of the first user, the document editor system 110 proceeds to blocks 220 through 230.

At block 220, the system updates a list of votes associated with the interactive poll element by adding the vote, corresponding to the first user, to the list of votes associated with the interactive poll element. In some implementations, the document editor system 110 updates a list of votes associated with the interactive poll element by adding the vote, received at block 205 and corresponding to the first user, to the list of votes associated with the interactive poll element.

At block 225, the system updates a cryptographic digital signature associated with the interactive poll element, the cryptographic digital signature being based on (i) a hash value generated based on the updated list of votes and (ii) an identifier associated with the first document. In some implementations, the document editor system 110 updates a cryptographic digital signature associated with the interactive poll element, the cryptographic digital signature being based on (i) a hash value generated based on the updated list of votes from block 220 and (ii) an identifier associated with the first document.

At block 230, the system provides the updated list of votes and the updated cryptographic digital signature to each of the plurality of users. In some implementations, the document editor system 110 provides the updated list of votes from block 220 and the updated cryptographic digital signature from block 225 to each of the plurality of users. In some implementations, the document editing application rendered by the web browser may receive the updated list of votes from the document editor system 110 and update a rendering of the first document, displayed on one or more of the user interface output devices of one of the clients 140-1, . . . , 140-n, to cause the updated list of votes and/or information based on the updated list of votes (e.g., a vote tally for each of one or more voting options) to be displayed.

At block 235, the system receives second user interface input that indicates a second vote, associated with a second user, in the interactive poll element embedded in the first document in the document editing application. In some implementations, a user (e.g., a third user) may use one or more of the user interface input devices of one of the clients 140-1, . . . , 140-n to provide the second user interface input that indicates that second vote, that is received by the document editing system 110. In some implementations, the second user interface input may include a single tap/click of the user (e.g., on an icon in the user interface, the icon being associated with an interactive poll element) or may include two or more taps/clicks (e.g., a first tap/click may bring up a menu, and a second tap/click may select a menu item from the menu, the menu item being associated with an interactive poll element). The second user interface input received by the document editor system 110 from one of the clients 140-1, . . . , 140-n may identify, from one or more voting options, a vote to cast (e.g., based on a location of the click/tap, based on a cursor location, and/or based on additional input following or preceding the tap(s)/click(s)).

At block 240, the system determines that the second user interface input is received via a second instance of the document editing application. The second instance of the document editing application may not be associated with a logged in account of the second user. In some implementations, the document editor system 110 determines that the second user interface input is received, at block 235, via a second instance of the document editing application running on one of the clients 140-1, . . . , 140-n, the second instance of the document editing application not being associated with a logged in account of the second user. For example, the second instance of the document editing application may instead be associated with a logged in account of a third user, or may not be associated with any logged in account (e.g., the document editing application may be in a logged out state).

At block 245, in response to determining that the second user interface input is received via the second instance of the document editing application, the second instance of the document editing application not being associated with the logged in account of the second user, the system determines that the second vote is invalid. In some implementations, in response to determining at block 240 that the second user interface input is received via the second instance of the document editing application, the second instance of the document editing application not being associated with the logged in account of the second user, the document editor system 110 determines that the second vote is invalid.

At block 250, in response to determining that the second vote is invalid, the system avoids updating the list of votes associated with the interactive poll element. In some implementations, in response to determining at block 245 that the second vote is invalid, the document editor system 110 avoids updating the list of votes associated with the interactive poll element. Accordingly, the interactive poll element is not updated based on the second vote that is determined to be invalid at block 245. Instead, in some implementations, the second vote is discarded, and the vote tally for each of one or more voting options remains unchanged. In other implementations, the document editor system 110 may cause one or more of the clients 140-1, . . . , 140-n to provide, within a user interface, an indication that an invalid vote was received.

Figure 3:
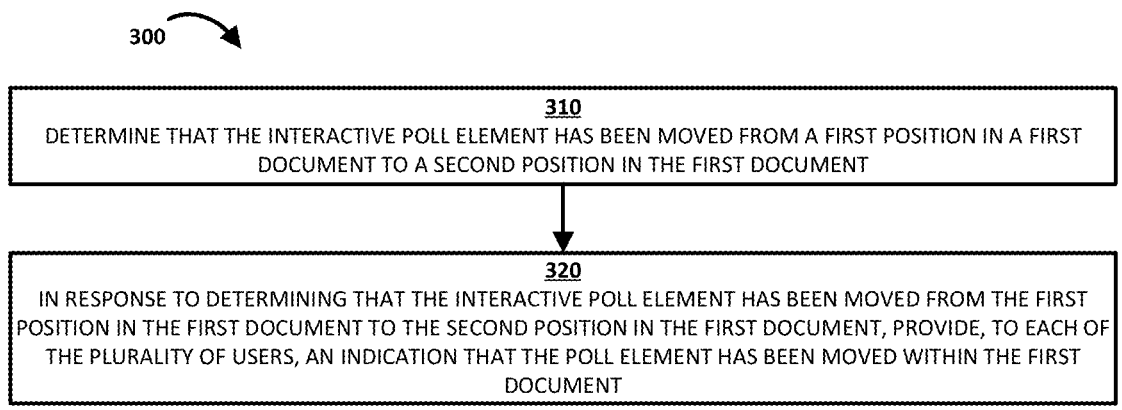

FIG. 3 depicts a flowchart illustrating an example method 300 of implementing collaborative poll elements within a document in a document editing application. For convenience, the operations of the method 300 are described with reference to a system that performs the operations. This system of method 300 includes one or more processors and/or other component(s) of various computer systems. Moreover, while operations of method 300 are shown in a particular order, this is not meant to be limiting. One or more operations may be reordered, omitted, or added.

At block 310, the system determines that the interactive poll element has been moved from a first position in a first document to a second position in the first document. In some implementations, the document editor system 110 determines that the interactive poll element has been moved from a first position in a first document to a second position in the first document.

For example, a user may use one or more of the user interface input devices of one of the clients 140-1, . . . , 140-n to provide user interface input to cause the interactive poll element to be moved from a first position in a first document to a second position in the first document. In some implementations, the user interface input may include a single tap/click of the first user (e.g., on an icon in the user interface, the icon being associated with an interactive poll element) or may include two or more taps/clicks (e.g., a first tap/click may bring up a menu, a second tap/click may select a "cut" item from the menu, a third tap/click may select an insertion point in the document, a fourth tap/click may bring up the menu, and a fifth tap/click may select a "paste" item from the menu). Based on the user interface input, metadata associated with the interactive poll element, metadata associated with the first document, and/or any other information available to the document editor system 110, the document editor system 110 may determine that the interactive poll element has been moved from a first position in a first document to a second position in the first document.

At block 320, in response to determining that the interactive poll element has been moved from the first position in the first document to the second position in the first document, the system provides, to each of the plurality of users, an indication that the poll element has been moved within the first document. In some implementations, in response to determining at block 310 that the interactive poll element has been moved from the first position in the first document to the second position in the first document, the document editor system 110 provides, to each of the plurality of users, an indication that the poll element has been moved within the first document. For example, the document editor system 110 may cause one or more of the clients 140-1, . . . , 140-*n* to provide, within a user interface, an indication that the poll element has been moved within the first document.

Still referring to block 320, in other implementations, in response to determining that the interactive poll element has been moved from the first position to the second position, based on both the first position and the second position being in the same document (i.e., the first document), the system may not provide any indication that the poll element has been moved.

Figure 4:
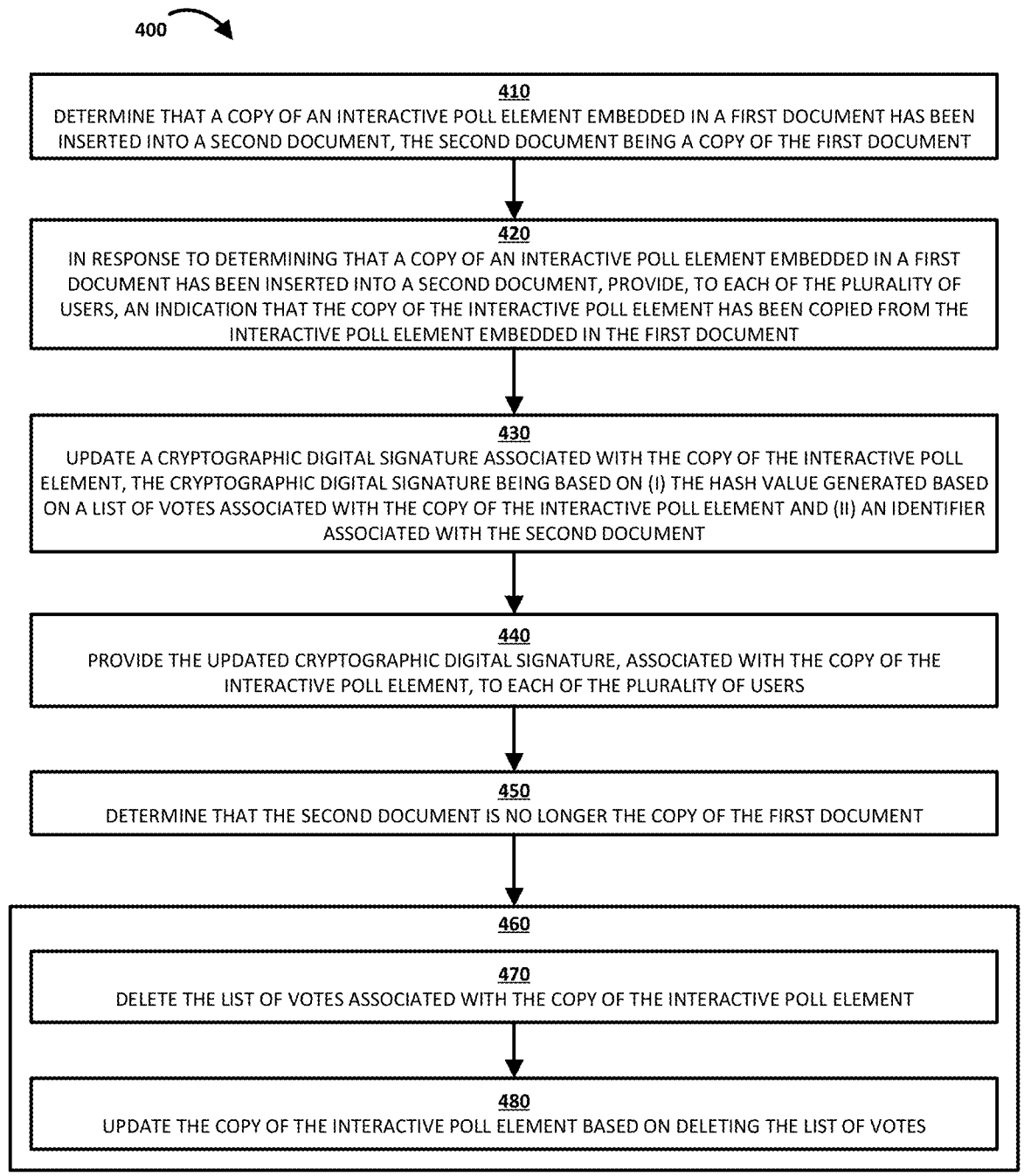

FIG. 4 depicts a flowchart illustrating an example method 400 of implementing collaborative poll elements within a document in a document editing application. For convenience, the operations of the method 400 are described with reference to a system that performs the operations. This system of method 400 includes one or more processors and/or other component(s) of various computer systems. Moreover, while operations of method 400 are shown in a particular order, this is not meant to be limiting. One or more operations may be reordered, omitted, or added.

At block 410, the system determines that a copy of an interactive poll element embedded in a first document has been inserted into a second document, the second document being a copy of the first document. In some implementations, the document editor system 110 determines that a copy of an interactive poll element embedded in a first document has been inserted into a second document, the second document being a copy of the first document.

For example, a user may use one or more of the user interface input devices of one of the clients 140-1, . . . , 140-*n* to insert a copy of the interactive poll element embedded in the first document into the second document. In some implementations, the user interface input may include a single tap/click of the first user (e.g., on an icon in the user interface, the icon being associated with an interactive poll element) or may include two or more taps/clicks (e.g., a first tap/click may bring up a menu, a second tap/click may select a "cut" item from the menu, a third tap/click may open the second document, a fourth tap/click may select an insertion point in the second document, a fifth tap/click may bring up the menu, and a sixth tap/click may select a "paste" item from the menu). Based on the user interface input, metadata associated with the interactive poll element, metadata associated with the first and/or second documents, and/or any other information available to the document editor system 110, the document editor system 110 may determine that the interactive poll element has been copied from the first document to the second document and may further determine that the second document is a copy of the first document.

In other implementations, the system determines that the interactive poll element has been moved from the first document to a second document, the second document being different from the first document; and in response to determining that the interactive poll element has been moved from the first document to the second document: the system deletes the list of votes associated with the interactive poll element; and the system updates the interactive poll element based on deleting the list of votes.

At block 420, in response to determining that a copy of an interactive poll element embedded in a first document has been inserted into a second document, the system provides, to each of the plurality of users, an indication that the copy of the interactive poll element has been copied from the interactive poll element embedded in the first document. In some implementations, in response to determining at block 410 that a copy of an interactive poll element embedded in a first document has been inserted into a second document, the document editor system 110 provides, to each of the plurality of users, an indication that the copy of the interactive poll element has been copied from the interactive poll element embedded in the first document. For example, the document editor system 110 may cause one or more of the clients 140-1, . . . , 140-*n* to provide, within a user interface, an indication that the copy of the interactive poll element has been copied from the interactive poll element embedded in the first document.

At block 430, the system updates a cryptographic digital signature associated with the copy of the interactive poll element, the cryptographic digital signature being based on (i) the hash value generated based on a list of votes associated with the copy of the interactive poll element (e.g., the updated list of votes from block 220 of FIG. 2) and (ii) an identifier associated with the second document. In some implementations, the document editor system 110 updates a cryptographic digital signature associated with the copy of the interactive poll element, the cryptographic digital signature being based on (i) the hash value generated based on a list of votes associated with the copy of the interactive poll element (e.g., the updated list of votes from block 220 of FIG. 2) and (ii) an identifier associated with the second document.

At block 440, the system provides the updated cryptographic digital signature, associated with the copy of the interactive poll element, to each of the plurality of users. In some implementations, the document editor system 110 provides the updated cryptographic digital signature, associated with the copy of the interactive poll element, to each of the plurality of users.

At block 450, the system determines that the second document is no longer the copy of the first document. In some implementations, based on user interface input, metadata associated with the interactive poll element, metadata associated with the first and/or second documents, and/or any other information available to the document editor system 110 the document editor system 110 determines that the second document is no longer the copy of the first document.

At block 460, in response to determining that the second document is no longer the copy of the first document, the system proceeds to blocks 470 through 480. In some implementations, in response to determining, at block 450, that the second document is no longer the copy of the first document, the document editor system 110 proceeds to blocks 470 through 480.

At block 470, the system deletes the list of votes associated with the copy of the interactive poll element. In some implementations, the document editor system 110 deletes the list of votes associated with the copy of the interactive poll element.

At block 480, the system updates the copy of the interactive poll element based on deleting the list of votes. In some implementations, the document editor system 110 updates the copy of the interactive poll element based on deleting the list of votes at block 470.

Figure 5:
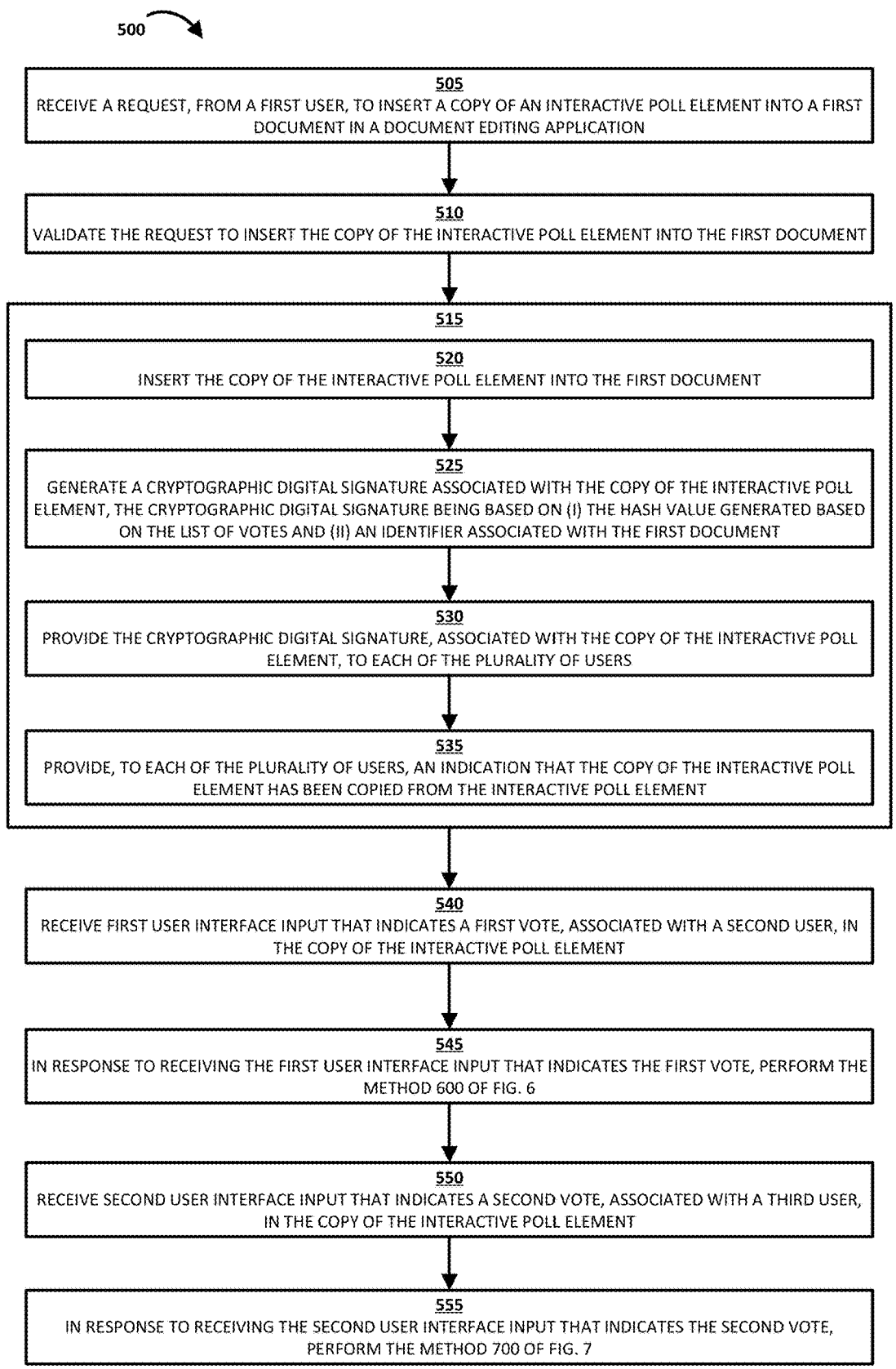

FIG. 5 depicts a flowchart illustrating an example method 500 of implementing collaborative poll elements within a document in a document editing application. For convenience, the operations of the method 500 are described with reference to a system that performs the operations. This system of method 500 includes one or more processors and/or other component(s) of various computer systems. Moreover, while operations of method 500 are shown in a particular order, this is not meant to be limiting. One or more operations may be reordered, omitted, or added.

At block 505, the system receives a request, from a first user, to insert a copy of an interactive poll element into a first document in a document editing application, the first document being accessible to a plurality of users including the first user, and the interactive poll element including (i) a list of votes associated with the interactive poll element and (ii) a cryptographic digital signature that is based on a hash value generated based on the list of votes and an identifier associated with a document into which the interactive poll element is embedded. In some implementations, the document editor system 110 receives a request, from a first user, to insert a copy of an interactive poll element into a first document in a document editing application, the first document being accessible to a plurality of users including the first user, and the interactive poll element including (i) a list of votes associated with the interactive poll element and (ii) a cryptographic digital signature that is based on a hash value generated based on the list of votes and an identifier associated with a document into which the interactive poll element is embedded.

For example, a user may use one or more of the user interface input devices of one of the clients 140-1, ..., 140-n to generate the request to insert the copy of the interactive poll element into the first document in the document editing application. In some implementations, the user interface input may include a single tap/click of the first user (e.g., on an icon in the user interface, the icon being associated with an interactive poll element) or may include two or more taps/clicks (e.g., a first tap/click may bring up a menu, a second tap/click may select a "copy" item from the menu, a third tap/click may select an insertion point, a fourth tap/click may bring up the menu, and a fifth tap/click may select a "paste" item from the menu).

At block 510, the system validates the request to insert the copy of the interactive poll element into the first document. Validating the request may be based on the list of votes and the cryptographic digital signature. In some implementations, the document editor system 110 validates the request, received at block 505, to insert the copy of the interactive poll element into the first document.

At block 515, in response to validating the request to insert the copy of the interactive poll element into the first document, the system proceeds to blocks 520 through 535. In some implementations, in response to validating, at block 510, the request to insert the copy of the interactive poll element into the first document, the document editor system 110 proceeds to blocks 520 through 535.

At block 520, the system inserts the copy of the interactive poll element into the first document. In some implementations, the document editor system 110 inserts the copy of the interactive poll element into the first document. In some implementations, the copy of the interactive poll element includes a copy of the list of votes associated with the interactive poll element.

At block 525, the system generates a cryptographic digital signature associated with the copy of the interactive poll element, the cryptographic digital signature being based on (i) the hash value generated based on the list of votes and (ii) an identifier associated with the first document. In some implementations, the document editor system 110 generates a cryptographic digital signature associated with the copy of the interactive poll element, the cryptographic digital signature being based on (i) the hash value generated based on the list of votes and (ii) an identifier associated with the first document.

At block 530, the system provides the cryptographic digital signature, associated with the copy of the interactive poll element, to each of the plurality of users. In some implementations, the document editor system 110 provides the cryptographic digital signature, associated with the copy of the interactive poll element, to each of the clients 140-1, ..., 140-n.

At block 535, the system provides, to each of the plurality of users, an indication that the copy of the interactive poll element has been copied from the interactive poll element. In some implementations, the document editor system 110 provides, to each of the plurality of users, an indication that the copy of the interactive poll element has been copied from the interactive poll element For example, the document editor system 110 may cause one or more of the clients 140-1, ..., 140-n to provide, within a user interface, an indication that the copy of the interactive poll element has been copied from the interactive poll element embedded.

At block 540, the system receives first user interface input that indicates a first vote, associated with a second user, in the copy of the interactive poll element. In some implementations, the document editor system 110 receives first user interface input that indicates a first vote, associated with a second user, in the copy of the interactive poll element. The second user may use one or more of the user interface input devices of one of the clients 140-1, ..., 140-n to provide the first user interface input that indicates the first vote, that is received by the document editing system 110. In some implementations, the first user interface input may include a single tap/click of the second user (e.g., on an icon in the user interface, the icon being associated with an interactive poll element) or may include two or more taps/clicks (e.g., a first tap/click may bring up a menu, and a second tap/click may select a menu item from the menu, the menu item being associated with an interactive poll element). The first user interface input received by the document editor system 110 from one of the clients 140-1, ..., 140-n may identify, from one or more voting options, a vote to cast (e.g., based on a location of the click/tap, based on a cursor location, and/or based on additional input following or preceding the tap(s)/click(s)).

Figure 6:
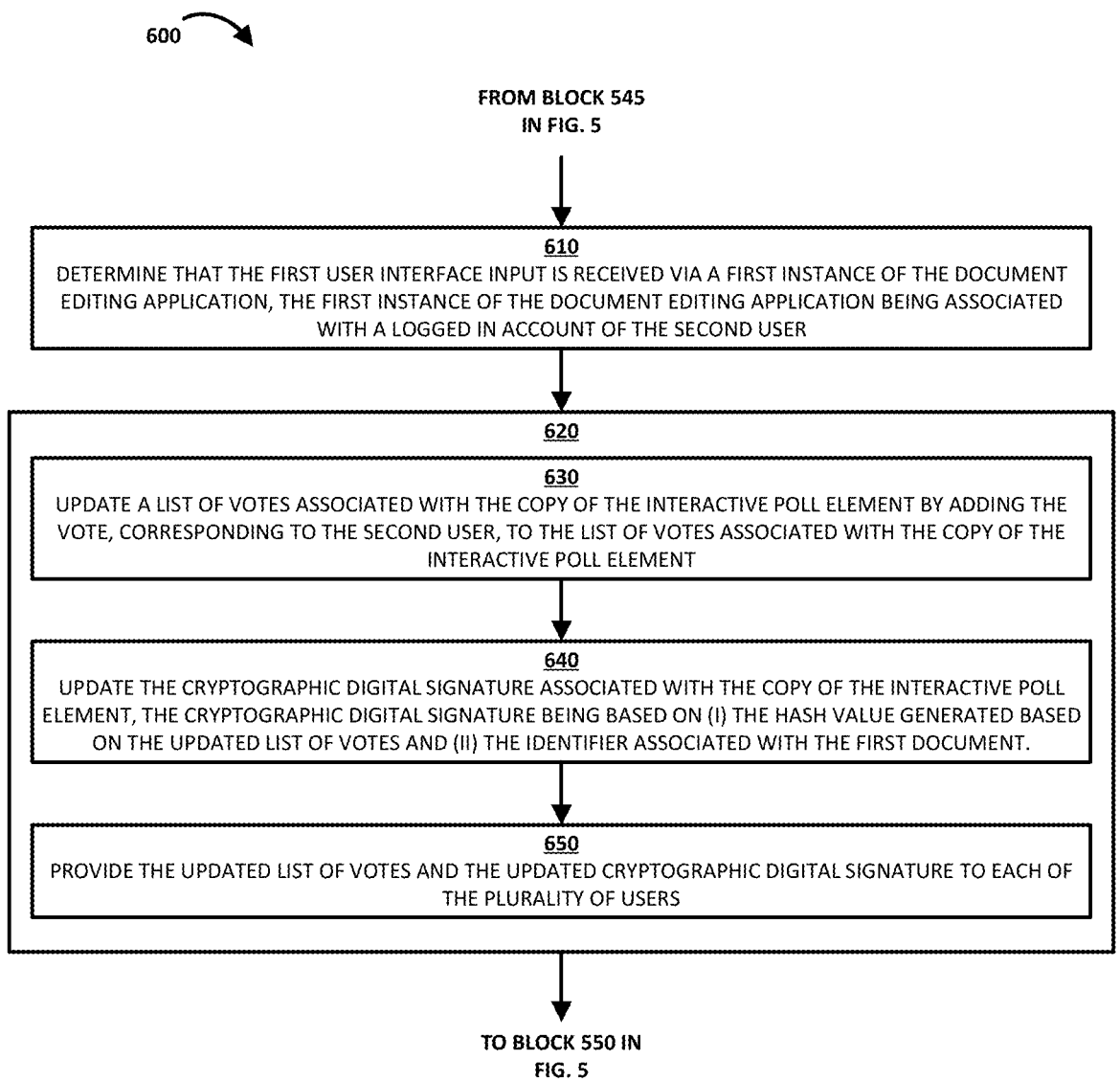

At block 545, in response to receiving the first user interface input that indicates the first vote, the system performs the method 600 of FIG. 6. In some implementations, in response to receiving the first user interface input that indicates the first vote at block 540, the document editor system 110 performs the method 600 of FIG. 6.

At block 550, the system receives second user interface input that indicates a second vote, associated with a third user, in the copy of the interactive poll element. In some implementations, the document editor system 110 receives second user interface input that indicates a second vote, associated with a third user, in the copy of the interactive poll element. The third user may use one or more of the user interface input devices of one of the clients 140-1, ..., 140-n to provide the second user interface input that indicates the second vote, that is received by the document editing system 110. In some implementations, the second user interface input may include a single tap/click of the third user (e.g., on an icon in the user interface, the icon being associated with an interactive poll element) or may include two or more taps/clicks (e.g., a first tap/click may bring up a menu, and a second tap/click may select a menu item from the menu, the menu item being associated with an interactive poll element). The second user interface input received by the document editor system 110 from one of the clients 140-1, ..., 140-n may identify, from one or more voting options, a vote to cast (e.g., based on a location of the click/tap, based on a cursor location, and/or based on additional input following or preceding the tap(s)/click(s)).

Figure 7:
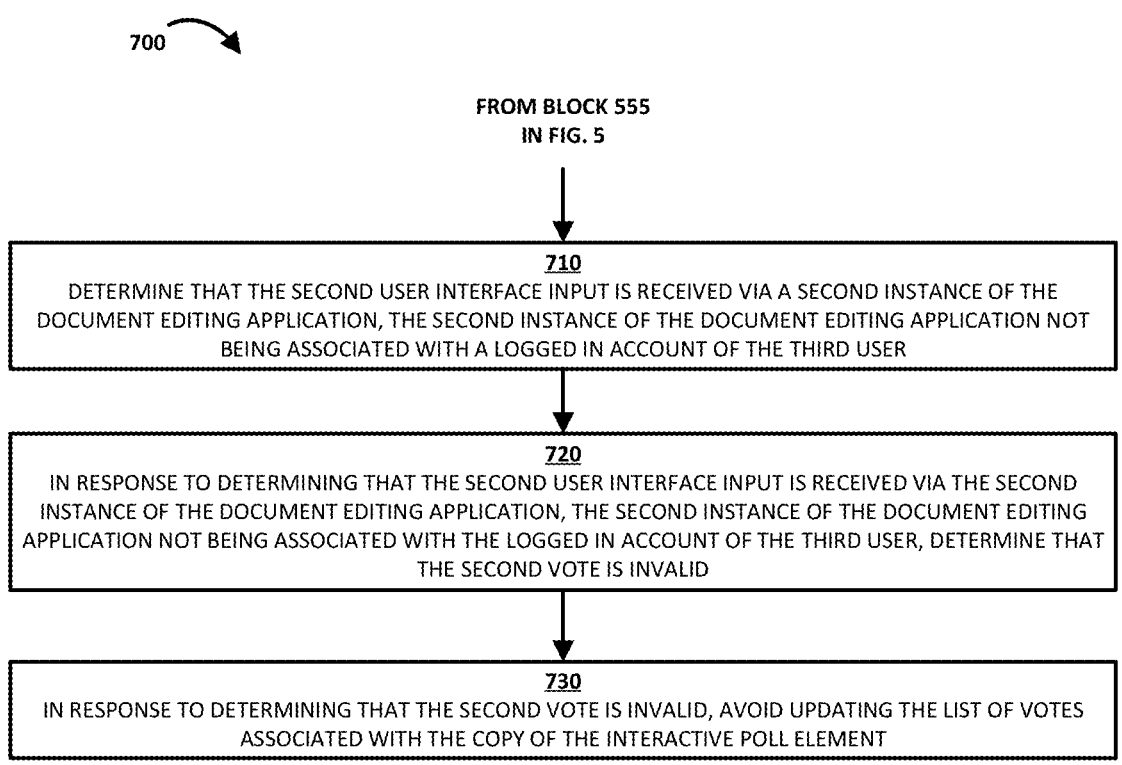

At block 555, in response to receiving the second user interface input that indicates the second vote, the system performs the method 700 of FIG. 7. In some implementations, in response to receiving the second user interface input that indicates the second vote at block 550, the document editor system 110 performs the method 700 of FIG. 7.

FIG. 6 depicts a flowchart illustrating an example method 600 of implementing collaborative poll elements within a document in a document editing application. For convenience, the operations of the method 600 are described with reference to a system that performs the operations. This system of method 600 includes one or more processors and/or other component(s) of various computer systems. Moreover, while operations of method 600 are shown in a particular order, this is not meant to be limiting. One or more operations may be reordered, omitted, or added.

At block 610, subsequent to receiving, at block 540 of FIG. 5, the first user interface input that indicates the first vote, associated with the second user, in the copy of the interactive poll element, the system determines that the first user interface input is received via a first instance of the document editing application, the first instance of the document editing application being associated with a logged in account of the second user. In some implementations, the document editor system 110 determines that the first user interface input is received via a first instance of the document editing application, the first instance of the document editing application being associated with a logged in account of the second user.

At block 620, in response to determining that the first user interface input is received via the first instance of the document editing application, the system proceeds to blocks 630 through 650. In some implementations, in response to determining, at block 610, that the first user interface input is received via the first instance of the document editing application, the document editor system 110 proceeds to blocks 630 through 650.

At block 630, the system updates a list of votes associated with the copy of the interactive poll element by adding the vote, corresponding to the second user, to the list of votes associated with the copy of the interactive poll element. In some implementations, the document editor system 110 updates a list of votes associated with the copy of the interactive poll element by adding the vote, corresponding to the second user, to the list of votes associated with the copy of the interactive poll element.

At block 640, the system updates the cryptographic digital signature associated with the copy of the interactive poll element, the cryptographic digital signature being based on (i) the hash value generated based on the updated list of votes and (ii) the identifier associated with the first document. In some implementations, the document editor system 110 updates the cryptographic digital signature associated with the copy of the interactive poll element, the cryptographic digital signature being based on (i) the hash value generated based on the updated list of votes and (ii) the identifier associated with the first document.

At block 650, the system provides the updated list of votes and the updated cryptographic digital signature to each of the plurality of users. In some implementations, the document editor system 110 provides the updated list of votes and the updated cryptographic digital signature to each of the plurality of users. In some implementations, the document editing application rendered by the web browser may receive the updated list of votes from the document editor system 110 and update a rendering of the first document, displayed on one or more of the user interface output devices of one of the clients 140-1, ..., 140-n, to cause the updated list of votes and/or information based on the updated of votes (e.g., a vote tally for each of one or more voting options) to be displayed.

FIG. 7 depicts a flowchart illustrating an example method 700 of implementing collaborative poll elements within a document in a document editing application. For convenience, the operations of the method 700 are described with reference to a system that performs the operations. This system of method 700 includes one or more processors and/or other component(s) of various computer systems. Moreover, while operations of method 700 are shown in a particular order, this is not meant to be limiting. One or more operations may be reordered, omitted, or added.

At block 710, subsequent to receiving, at block 550 of FIG. 5, the second user interface input that indicates a second vote, associated with a third user, in the copy of the interactive poll element, the system determines that the second user interface input is received via a second instance of the document editing application, the second instance of the document editing application not being associated with a logged in account of the third user. In some implementations, the document editor system 110 determines that the second user interface input is received via a second instance of the document editing application, the second instance of the document editing application not being associated with a logged in account of the third user.

At block 720, in response to determining that the second user interface input is received via the second instance of the document editing application, the second instance of the document editing application not being associated with the logged in account of the third user, the system determines that the second vote is invalid. In some implementations, in response to determining that the second user interface input is received via the second instance of the document editing application, the second instance of the document editing application not being associated with the logged in account of the third user, the document editor system 110 determines that the second vote is invalid.

At block 730, in response to determining that the second vote is invalid, the system avoids updating the list of votes associated with the copy of the interactive poll element. In some implementations, in response to determining at block 720 that the second vote is invalid, the document editor system 110 avoids updating the list of votes associated with the copy of the interactive poll element. Accordingly, the copy of the interactive poll element is not updated based on the second vote that is determined to be invalid at block 720. Instead, in some implementations, the second vote is discarded, and the vote tally for each of one or more voting options remains unchanged. In other implementations, the document editor system 110 may cause one or more of the clients 140-1, ..., 140-n to provide, within a user interface, an indication that an invalid vote was received.

FIG. 8 depicts an example of a document 800 in an online document editor system 110 displayed on one or more of the user interface output devices of one of the clients 140-1, ..., 140-n. Poll elements 810-1, 810-2, 810-3 are embedded in the document 800. The example of FIG. 8 is for illustrative purposes only.

Figure 9:
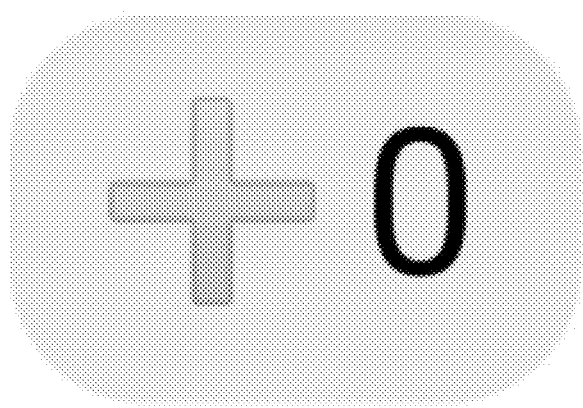
Figure 9:
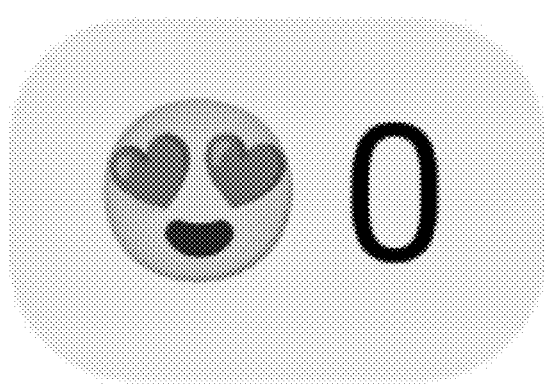

FIG. 9 depicts an example of poll elements 900, 910, which may be embedded into a document in an online document editor system 110 displayed on one or more of the user interface output devices of one of the clients 140-1, ..., 140-n. The example of FIG. 9 is for illustrative purposes only. In some implementations, the system may allow for using different emoji or combinations of emoji, to allow more flexibility in the appearance of the poll element. In some implementations, the poll elements 900, 910 include emojis expressing some sentiment, along with a count of the number of voting users.

Figure 10:

FIG. 10 depicts an example of a list of voting users 1010, which may be displayed when a user hovers a cursor over a poll element 1000. Additional vote information may be displayed along with the list of voting users 1010, such as an indication 1020 that alerts a user that the poll element was copied from another document. The example of FIG. 10 is for illustrative purposes only.

Figure 11:
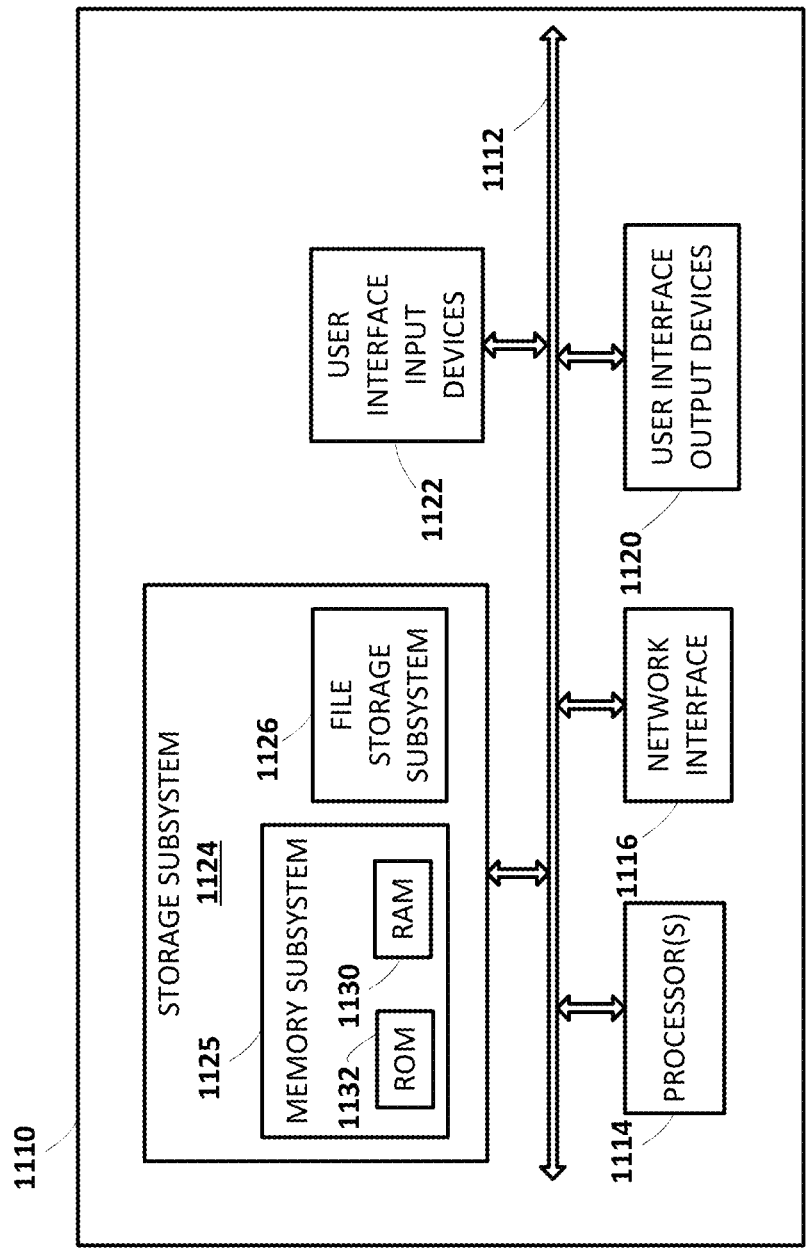
FIG. 11 illustrates an example architecture of a computing device.

FIG. 11 is a block diagram of an example computing device 1110 that may optionally be utilized to perform one or more aspects of techniques described herein. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of the methods of FIGS. 2, 3, 4, 5, 6, and 7, as well as to implement various components depicted in FIG. 1.

These software modules are generally executed by processor 1114 alone or in combination with other processors. The memory subsystem 1125 included in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
receiving first user interface input that indicates a first vote, associated with a first user, in an interactive poll element embedded in a first document in a document editing application, the first document being accessible to a plurality of users including the first user;
determining that the first user interface input is received via a first instance of the document editing application, the first instance of the document editing application being associated with a logged in account of the first user; and
in response to determining that the first user interface input is received via the first instance of the document editing application, the first instance of the document editing application being associated with the logged in account of the first user:

updating a list of votes associated with the interactive poll element by adding the first vote, corresponding to the first user, to the list of votes associated with the interactive poll element;

updating a cryptographic digital signature associated with the interactive poll element, the cryptographic digital signature being based on (i) a hash value generated based on the updated list of votes and (ii) an identifier associated with the first document; and providing the updated list of votes and the updated cryptographic digital signature to each of the plurality of users.

2. The method according to claim 1, further comprising:

receiving second user interface input that indicates a second vote, associated with a second user, in the interactive poll element embedded in the first document in the document editing application;

determining that the second user interface input is received via a second instance of the document editing application, the second instance of the document editing application not being associated with a logged in account of the second user;

in response to determining that the second user interface input is received via the second instance of the document editing application, the second instance of the document editing application not being associated with the logged in account of the second user, determining that the second vote is invalid; and in response to determining that the second vote is invalid, avoiding updating the list of votes associated with the interactive poll element.

3. The method according to claim 1, further comprising:

determining that the interactive poll element has been moved from a first position in the first document to a second position in the first document; and in response to determining that the interactive poll element has been moved from the first position in the first document to the second position in the first document, providing, to each of the plurality of users, an indication that the interactive poll element has been moved within the first document.

4. The method according to claim 1, further comprising:

determining that a copy of the interactive poll element embedded in the first document has been inserted into a second document, the second document being a copy of the first document; and in response to determining that the copy of the interactive poll element has been inserted into the second document, providing, to each of the plurality of users, an indication that the copy of the interactive poll element has been copied from the interactive poll element embedded in the first document.

5. The method according to claim 4, further comprising:

updating a cryptographic digital signature associated with the copy of the interactive poll element, the cryptographic digital signature being based on (i) the hash value generated based on the updated list of votes and (ii) an identifier associated with the second document; and providing the updated cryptographic digital signature, associated with the copy of the interactive poll element, to each of the plurality of users.

6. The method according to claim 4, further comprising:

determining that the second document is no longer the copy of the first document; and in response to determining that the second document is no longer the copy of the first document:

deleting the list of votes associated with the copy of the interactive poll element; and updating the copy of the interactive poll element based on deleting the list of votes.

7. The method according to claim 1, further comprising:

determining that the interactive poll element has been moved from the first document to a second document, the second document being different from the first document; and in response to determining that the interactive poll element has been moved from the first document to the second document:

deleting the list of votes associated with the interactive poll element; and updating the interactive poll element based on deleting the list of votes.

8. A computer program product comprising one or more non-transitory computer-readable storage media having program instructions collectively stored on the one or more computer-readable storage media, the program instructions executable to:

receive a request, from a first user, to insert a copy of an interactive poll element into a first document in a document editing application, the first document being accessible to a plurality of users including the first user, and the interactive poll element comprising (i) a list of votes associated with the interactive poll element and (ii) a cryptographic digital signature that is based on a hash value generated based on the list of votes and an identifier associated with a document into which the interactive poll element is embedded;

validate the request to insert the copy of the interactive poll element into the first document, wherein validating the request is based on the list of votes and the cryptographic digital signature;

in response to validating the request to insert the copy of the interactive poll element into the first document:

insert the copy of the interactive poll element into the first document;

generate a cryptographic digital signature associated with the copy of the interactive poll element, the cryptographic digital signature being based on (i) the hash value generated based on the list of votes and (ii) an identifier associated with the first document; and provide the cryptographic digital signature, associated with the copy of the interactive poll element, to each of the plurality of users.

9. The computer program product according to claim 8, wherein:

the first document is the document into which the interactive poll element is embedded; and the request to insert the copy of the interactive poll element into the first document comprises a request to insert the copy of the interactive poll element into the first document at a second location that is different from a first location, in the first document, at which the interactive poll element is positioned.

10. The computer program product according to claim 8, wherein the first document is a copy of the document into which the interactive poll element is embedded.

11. The computer program product according to claim 8, the program instructions further being executable to:

receive first user interface input that indicates a first vote, associated with a second user, in the copy of the interactive poll element;

determine that the first user interface input is received via a first instance of the document editing application, the first instance of the document editing application being associated with a logged in account of the second user;

in response to determining that the first user interface input is received via the first instance of the document editing application, the first instance of the document editing application being associated with the logged in account of the second user:

update a list of votes associated with the copy of the interactive poll element by adding the first vote, corresponding to the second user, to the list of votes associated with the copy of the interactive poll element;

update the cryptographic digital signature associated with the copy of the interactive poll element, the cryptographic digital signature being based on (i) the hash value generated based on the updated list of votes and (ii) the identifier associated with the first document; and provide the updated list of votes and the updated cryptographic digital signature to each of the plurality of users.

12. The computer program product according to claim 11, the program instructions further being executable to:

receive second user interface input that indicates a second vote, associated with a third user, in the copy of the interactive poll element;

determine that the second user interface input is received via a second instance of the document editing application, the second instance of the document editing application not being associated with a logged in account of the third user;

in response to determining that the second user interface input is received via the second instance of the document editing application, the second instance of the document editing application not being associated with the logged in account of the third user, determining that the second vote is invalid; and in response to determining that the second vote is invalid, avoiding updating the list of votes associated with the copy of the interactive poll element.

13. The computer program product according to claim 8, the program instructions further being executable to provide, to each of the plurality of users, an indication that the copy of the interactive poll element has been copied from the interactive poll element.

14. A system comprising:

a processor, a computer-readable memory, one or more computer-readable storage media, and program instructions collectively stored on the one or more computer-readable storage media, the program instructions executable to:

receive first user interface input that indicates a first vote, associated with a first user, in an interactive poll element embedded in a first document in a document editing application, the first document being accessible to a plurality of users including the first user;

determine that the first user interface input is received via a first instance of the document editing application, the first instance of the document editing application being associated with a logged in account of the first user; and in response to determining that the first user interface input is received via the first instance of the document editing application, the first instance of the document editing application being associated with the logged in account of the first user:

update a list of votes associated with the interactive poll element by adding the first vote, corresponding to the first user, to the list of votes associated with the interactive poll element;

update a cryptographic digital signature associated with the interactive poll element, the cryptographic digital signature being based on (i) a hash value generated based on the updated list of votes and (ii) an identifier associated with the first document; and provide the updated list of votes and the updated cryptographic digital signature to each of the plurality of users.

15. The system according to claim 14, the program instructions further being executable to:

receive second user interface input that indicates a second vote, associated with a second user, in the interactive poll element embedded in the first document in the document editing application;

determine that the second user interface input is received via a second instance of the document editing application, the second instance of the document editing application not being associated with a logged in account of the second user;

in response to determining that the second user interface input is received via the second instance of the document editing application, the second instance of the document editing application not being associated with the logged in account of the second user, determine that the second vote is invalid; and in response to determining that the second vote is invalid, avoid updating the list of votes associated with the interactive poll element.

16. The system according to claim 14, the program instructions further being executable to:

determine that the interactive poll element has been moved from a first position in the first document to a second position in the first document; and in response to determining that the interactive poll element has been moved from the first position in the first document to the second position in the first document, provide, to each of the plurality of users, an indication that the interactive poll element has been moved within the first document.

17. The system according to claim 14, the program instructions further being executable to:

determine that a copy of the interactive poll element embedded in the first document has been inserted into a second document, the second document being a copy of the first document; and in response to determining that the copy of the interactive poll element has been inserted into the second document, provide, to each of the plurality of users, an indication that the copy of the interactive poll element has been copied from the interactive poll element embedded in the first document.

18. The system according to claim 17, the program instructions further being executable to:

update a cryptographic digital signature associated with the copy of the interactive poll element, the cryptographic digital signature being based on (i) the hash value generated based on the updated list of votes and (ii) an identifier associated with the second document; and provide the updated cryptographic digital signature, associated with the copy of the interactive poll element, to each of the plurality of users.

19. The system according to claim 17, the program instructions further being executable to:
   determine that the second document is no longer the copy of the first document; and
   in response to determining that the second document is no longer the copy of the first document:
      delete the list of votes associated with the copy of the interactive poll element; and
      update the copy of the interactive poll element based on deleting the list of votes.

20. The system according to claim 14, the program instructions further being executable to:
   determine that the interactive poll element has been moved from the first document to a second document, the second document being different from the first document; and
   in response to determining that the interactive poll element has been moved from the first document to the second document:
      delete the list of votes associated with the interactive poll element; and
      update the interactive poll element based on deleting the list of votes.

\* \* \* \* \*